(12) United States Patent
Hargrave et al.

(10) Patent No.: US 11,118,426 B2
(45) Date of Patent: Sep. 14, 2021

(54) VACUUM INSULATED TUBING FOR HIGH PRESSURE, HIGH TEMPERATURE WELLS, AND SYSTEMS AND METHODS FOR USE THEREOF, AND METHODS FOR MAKING

(71) Applicant: Chevron U.S.A. Inc., San Ramon, CA (US)

(72) Inventors: Robert Eugene Hargrave, Conroe, TX (US); Jonathan Scarborough Lee, Spring, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 16/442,787

(22) Filed: Jun. 17, 2019

(65) Prior Publication Data

US 2020/0393065 A1   Dec. 17, 2020

(51) Int. Cl.
*E21B 36/00* (2006.01)
*F16L 13/02* (2006.01)
*E21B 17/04* (2006.01)
*E21B 17/042* (2006.01)
*E21B 17/08* (2006.01)
(Continued)

(52) U.S. Cl.
CPC ............ *E21B 36/003* (2013.01); *E21B 17/04* (2013.01); *E21B 17/042* (2013.01); *E21B 17/08* (2013.01); *F16L 13/02* (2013.01); *F16L 59/065* (2013.01); *C22C 19/056* (2013.01); *C22C 38/44* (2013.01);
(Continued)

(58) Field of Classification Search
CPC ....... F16L 13/02; F16L 15/00; F16L 2201/40; F16L 59/065; E21B 17/00; E21B 17/08; E21B 17/042; E21B 17/04; E21B 36/003; C22C 38/44; C22C 19/056
See application file for complete search history.

(56) References Cited

U.S. PATENT DOCUMENTS 3,885,922 A * 5/1975 Thomas, Jr. ........... B23K 9/038
                                                  428/683
4,211,503 A * 7/1980 Peterson ............... E02B 17/027
                                                  405/195.1
(Continued)

OTHER PUBLICATIONS

Kimura et al., SPE 98074 Development of New 15Cr Stainless Steel OCTG With Superior Corrosion, 2005, p. 1. (Year: 2005).*
(Continued)

*Primary Examiner* — Nicole Coy
(74) *Attorney, Agent, or Firm* — Jason M. Guerrero

(57) ABSTRACT

Disclosed is a VIT apparatus for mitigating APB in a wellbore casing annulus of a HPHT deepwater well. The apparatus includes inner and outer tubes formed of 15Cr-135 martensitic stainless steel having a vacuum space therebetween and a weld formed of high yield strength alloy for joining the inner and outer tubes. A protective weld overlay formed of corrosion resistant alloy is placed over the weld. The weld and the weld overlay are formed so as not to extend into the inner bore. Also disclosed are a process for forming the apparatus, and a system and method for using the apparatus. Multiple apparatus are connected by threaded couplings to form an elongated device that can be placed within a casing within a wellbore to carry fluids from the deepwater well to a surface location. When exposed to HPHT well conditions, the vacuum in the VIT apparatus is not lost.

13 Claims, 3 Drawing Sheets

(51) Int. Cl.
*F16L 59/065* (2006.01)
*C22C 19/05* (2006.01)
*C22C 38/44* (2006.01)
*F16L 15/00* (2006.01)
*E21B 17/00* (2006.01)

(52) U.S. Cl.
CPC ............... *E21B 17/00* (2013.01); *F16L 15/00* (2013.01); *F16L 2201/40* (2013.01)

(56) References Cited

U.S. PATENT DOCUMENTS

| | | | |
|---|---|---|---|
| 4,415,184 A * | 11/1983 | Stephenson | E21B 17/00 138/149 |
| 4,453,570 A | 6/1984 | Hutchison | |
| 4,496,001 A | 1/1985 | Sigworth | |
| 4,673,652 A * | 6/1987 | McStravick | E21B 17/00 138/149 |
| 6,536,526 B2 | 3/2003 | Cox | |
| 7,207,603 B2 | 4/2007 | Segreto | |
| 8,066,074 B2 | 11/2011 | Maskos et al. | |
| 8,828,312 B2 * | 9/2014 | Yao | C23C 28/021 419/9 |
| 9,027,607 B2 | 5/2015 | Pan et al. | |
| 9,835,009 B2 | 12/2017 | Hess et al. | |
| 10,161,221 B2 | 12/2018 | Mills et al. | |
| 2008/0314599 A1 | 12/2008 | Bane et al. | |
| 2017/0247983 A1 | 8/2017 | Funkhouser et al. | |
| 2019/0063191 A1 | 2/2019 | Roussie | |

OTHER PUBLICATIONS

Lincoln ER410NIMO, Issue Date 12/15, p. 1. (Year: 2015).*
JFE Technical Report No. 18, "Corrosion Resistant High Cr Steel for Oil and Gas Wells", Mar. 2013, pp. 63-65 (Year: 2013).*

* cited by examiner

VACUUM INSULATED TUBING FOR HIGH PRESSURE, HIGH TEMPERATURE WELLS, AND SYSTEMS AND METHODS FOR USE THEREOF, AND METHODS FOR MAKING

FIELD

The present disclosure relates generally to the field of vacuum insulated tubing for use in deepwater oil and gas wells. The present disclosure further relates to systems using vacuum insulated tubing and methods for making vacuum insulated tubing.

BACKGROUND

In the context of deepwater oil and gas wells, annular pressure buildup (APB) is the pressure increase in the wellbore casing annulus caused by temperature changes in the wellbore during production. Referring to FIG. 1, shown is a prior art deepwater oil and gas well 100 including nested casings as shown within a wellbore 30 in a formation 35 located below the seabed 1. Between casing 60 and casing 70 is an annulus 80. Cement 85 may also be located between casings 60 and 70. Production tubing 40 delivers production fluids to the surface. Between Production tubing 40 and casing 60 is an inner annulus 90. High temperatures can be transferred from the high temperature production fluids within production tubing 40 to the annulus 90 and 80. The temperature increase in annulus 80 can result in pressure increases in the annulus that can in turn result in collapse of casing 60. Such collapse can cause the loss of the well.

Vacuum insulated tubing (VIT) 50 is a known device for use in such deepwater wells to mitigate APB in the annulus 80. As used herein, a VIT 50 is a tube-within-a-tube to be located in a deepwater well 100 connected in-line to the production tubing 40 such that production fluids flow through the VIT 50. The VIT has a vacuum gap there within between the inner and outer tubes of the VIT 50 to reduce heat transfer from the production fluids within the inner tube into the annulus 80. For example, known VITs made from Super 13Cr stainless steel tubing are available from Vallourec Tube-Alloy, LLC (Houston, Tex.). In some high pressure, high temperature (HPHT) wells, defined as having a pressure greater than 15,000 psi or a temperature greater than 350° F., the pressure of the well can be so great that no known VIT can meet design requirements for high collapse strength. Furthermore, the welds between the inner and outer tubes of existing VITs are highly susceptible to corrosion and/or cracking. Such weld damage is unacceptable as this can result in loss of vacuum in the space between the inner and outer tube of the VIT. Previous attempts have been made to protect the weld using a High-Velocity Oxygen Fuel (HVOF) coating of Hastelloy C-276 over the weld, although this solution still does not meet drilling and completion design requirements for HPHT deepwater well projects. For instance, the HVOF coating has been found to crack and spall during tensile stress testing.

What is needed is a VIT capable of withstanding higher pressures than known VITs are capable of withstanding such as those pressures encountered in high pressure, high temperature deepwater wells without collapsing and without losing vacuum. What is also needed is a high collapse VIT with a weld that resists corrosion and $H_2S$ cracking environments found in some HPHT production wells.

SUMMARY

In general, in one aspect, the disclosure relates to an apparatus for mitigating annular pressure buildup in a wellbore casing annulus of an oil or gas well. The apparatus includes an inner tubular member and an outer tubular member having an annular space between the inner tubular member and the outer tubular member, the annular space having a vacuum there within. A weld is placed at the inner cylindrical corner for joining the inner and outer tubular members. A weld overlay is placed over the weld for protecting the weld formed using a mechanized gas tungsten arc process. The weld and the weld overlay do not extend into the inner bore.

In another aspect, the disclosure can generally relate to a process for forming the apparatus as described above for mitigating annular pressure buildup in a wellbore casing annulus of an oil or gas well. The process includes providing an inner tubular member, providing an outer tubular member, positioning the outer tubular member around the inner tubular member and overlapping the end of the inner tubular member such that an inner cylindrical corner is formed at an intersection between the outer tubular member and the end of the inner tubular member, forming a weld at the inner cylindrical corner having a weld surface, modifying the weld surface to facilitate application of a weld overlay onto the weld surface, and forming the weld overlay over the weld surface such that the weld and the weld overlay do not extend into the inner bore.

In another aspect, the disclosure can generally relate to a device for mitigating annular pressure buildup in a wellbore casing annulus of an oil or gas well that includes multiple apparatus as described above connected by threaded couplings.

In another aspect, the disclosure can generally relate to a system for producing oil and gas from a deepwater well, the system including a wellbore extending into a deepwater subterranean reservoir, a casing within the wellbore, and the device within the casing for carrying fluids from the deepwater subterranean reservoir to a surface location while mitigating annular pressure buildup in an annulus in the casing.

In another aspect, the disclosure can generally relate to a method for producing oil and gas from a deepwater well. The method includes placing the device within a casing within a wellbore extending into a deepwater subterranean reservoir, and carrying fluids from the deepwater subterranean reservoir to a surface location through the device. When exposed to conditions in HPHT wells, the vacuum in the device is not lost. The weld between the inner and outer tubes of the device is resistant to corrosion or cracking that could result in loss of vacuum.

BRIEF DESCRIPTION OF THE DRAWINGS

These and other objects, features and advantages of the present invention will become better understood with reference to the following description, appended claims and accompanying drawings. The drawings are not considered limiting of the scope of the appended claims. Reference numerals designate like or corresponding, but not necessarily identical, elements. The drawings illustrate only example embodiments. The elements and features shown in the drawings are not necessarily to scale, emphasis instead being placed upon clearly illustrating the principles of the example embodiments. Additionally, certain dimensions or positionings may be exaggerated to help visually convey such principles.

DETAILED DESCRIPTION

Figure 1:
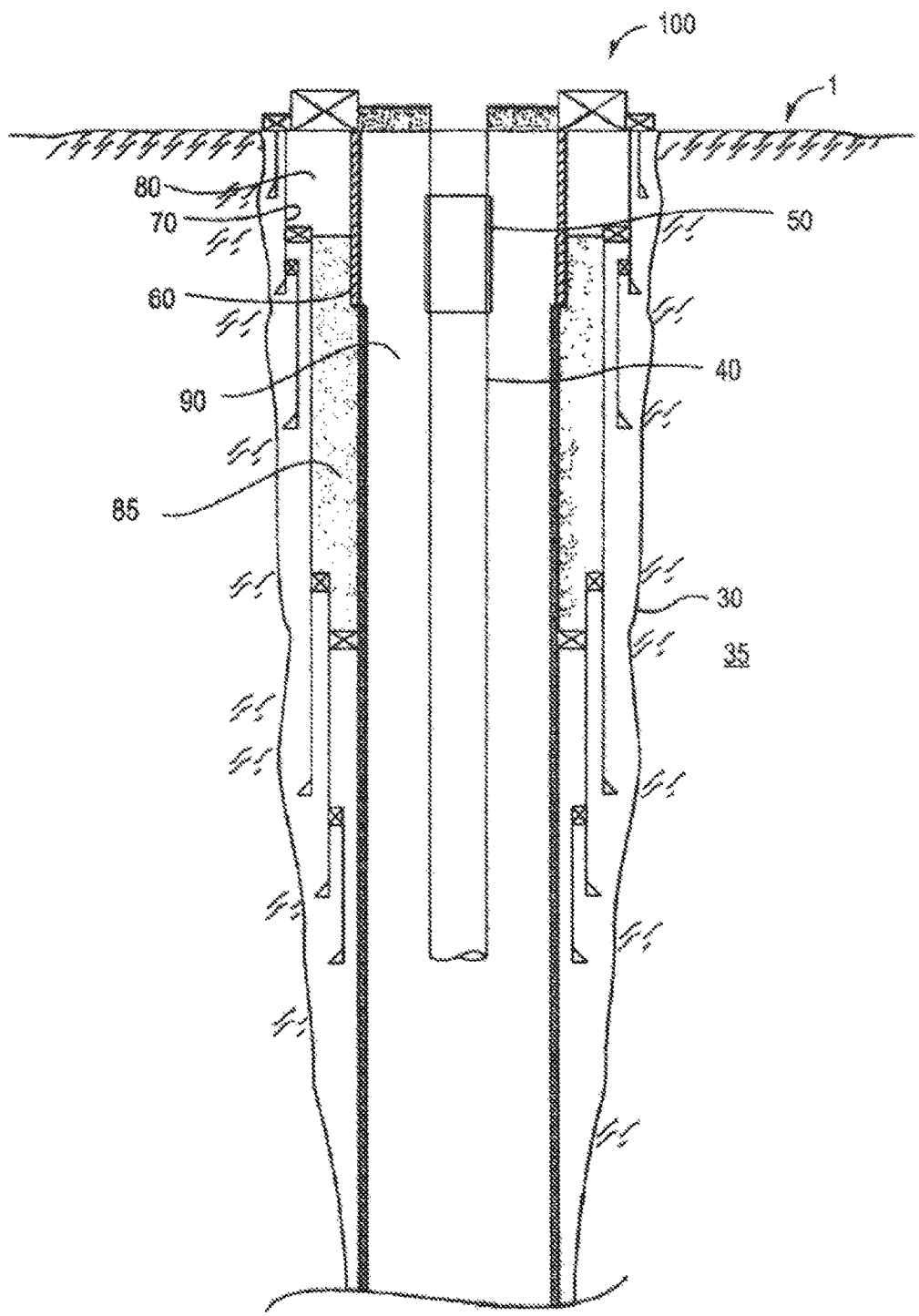
FIG. 1 shows a schematic diagram of a prior art field system in which example embodiments can be applied.

In one embodiment, a VIT apparatus for mitigating APB in a wellbore casing annulus 80 of an oil or gas well 100 is provided having superior ability to withstand high pressure and high temperature conditions (i.e., pressure greater than 15,000 psi or temperature greater than 350° F.) in deepwater wells without collapse of wellbore casing annulus 80 and without losing vacuum in the VIT apparatus. Referring to FIG. 1, described in the Background herein, a deepwater well 100 in which example embodiments can be used is shown. The VIT of the present disclosure can be used in place of known VITs 50.

Figure 2:
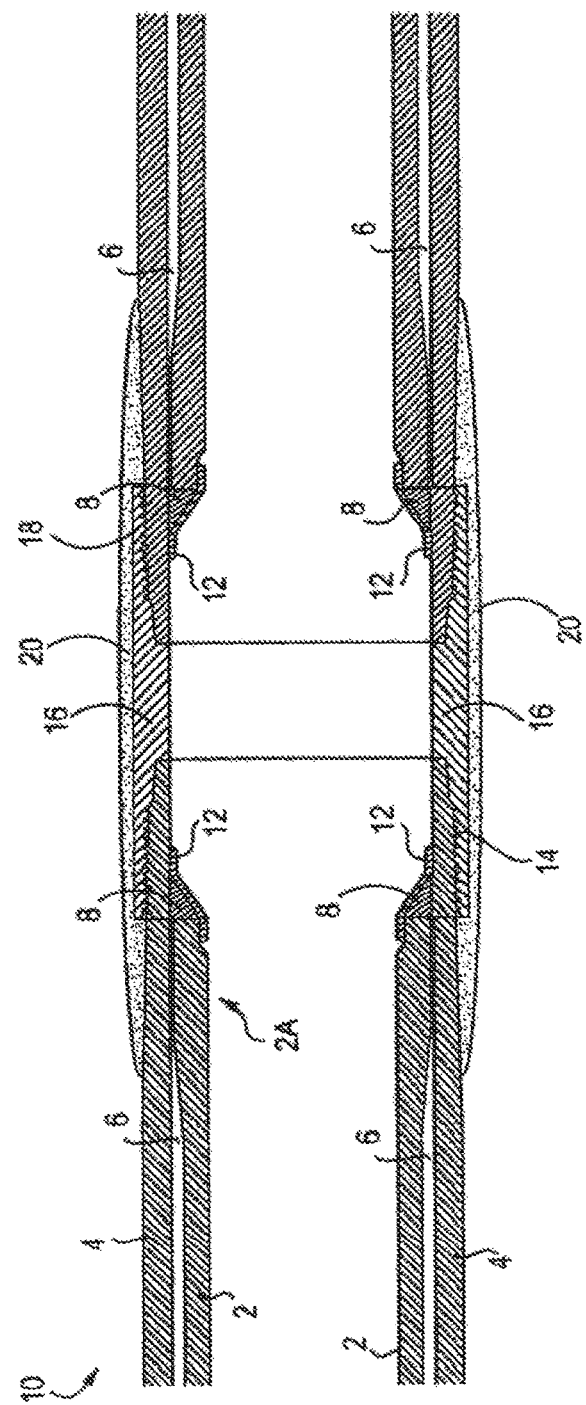
FIG. 2 shows a cross-sectional view of an example apparatus.

Referring to FIG. 2, one example embodiment of the VIT 10 of the present disclosure is shown. The VIT 10 has an inner tubular member 2, also referred to as the inner tube 2, having a maximum outer diameter, an outer profile, an upset end 2A, and a substantially constant inner diameter defining an inner bore. By "upset end" is meant an end of the inner tube having a thicker wall then the rest of the tube. The upset end 2A is created during manufacturing of the inner tube 2. Upsetting is a well-known forging process used to manufacture thicker walls on tube ends. This thicker wall of the upset end 2A is needed for threading the tube 2 and to facilitate the welding as will be further described herein.

The VIT 10 also has an outer tubular member 4, also referred to as the outer tube 4, having an outer profile, an inner profile, an inner diameter and an outer tube end. The outer tube 4 fits around the inner tube 2. The outer tube 4 fits around the inner tube 2 in a way that overlaps the upset end of the inner tube 2 such that the end of the outer tube 4 extends beyond the upset end of the inner tube 2. In one embodiment, the outer tube 4 has a slightly larger outer diameter (OD) than the production tubing. In a nonlimiting example, the production tubing can have an OD of 4.5 in or 5.5 in depending on location in the well, and the outer tube 4 can have an OD of 6.1 in. The inner tube 2 can have an OD of 4.5 in. The overall VIT 10 is determined for each well, and can be on the order of thousands of feet in length. The length of the VIT 10 is divided into sections that can be on the order of tens of feet in length connected at joints by way of couplings 16.

The outer tube 4 and the inner tube 2 can be made from a suitable material for providing the requisite strength and collapse strength under the conditions the VIT 10 will experience in the field system. In one embodiment, the outer tube 4 and the inner tube 2 are made from an alloy having a yield strength of at least 135 ksi, even from 135 to 150 ksi when measured according to ASTM A370 and E8 (as of May 2019). The yield strength advantageously enables the needed higher collapse rating as the collapse rating is based on calculated collapse pressure according to design equations that use the nominal yield strength as specified in API TR 5C3, 7th Edition, June 2018, "Calculating Performance Properties of Pipe Used as Casing or Tubing." In one embodiment, the outer tube 4 and the inner tube 2 are made from a weldable 14-16% chromium steel alloy, also referred to as 15Cr steel. An example of such tubing is UHP-15Cr-135 OCTG (oil country tubular goods) tubing available from JFE Steel America, Inc. (Houston, Tex.).

An annular space 6, also referred to as the vacuum gap, is formed by the outer profile of the inner tube 2 and the inner profile of the outer tube 4, having a vacuum there within. The vacuum is created using any suitable technology employed in known VIT manufacturing.

An inner cylindrical corner is formed at an intersection between the outer tube 4 and the end of the inner tube 2. A weld 8, such as a fillet weld, is formed at the inner cylindrical corner for joining the inner and outer tubes and sealing the vacuum of the vacuum gap 6. The weld 8 is made from a suitable weld material compatible with the 15Cr tubing. In one embodiment, the weld material is ER410NiMo which contains 12.0% Cr, 4.5% Ni, and 0.55% Mo. In one embodiment, the strength of the weld material exceeds 125 ksi. The weld 8 is formed by gas tungsten arc welding (GTAW), also known as tungsten inert gas ("tig") welding using a mechanized weld machine.

A protective weld overlay 12 completely covers the surface of the weld 8. The weld 8 and the weld overlay 12 do not extend, i.e., protrude, into the inner bore of the VIT 10; therefore the inner diameter drift of the VIT 10 is not impacted by the weld 8 and the weld overlay 12. In one embodiment, the weld overlay 12 has a thickness from about 0.12 in to about 0.13 in. For example, the thickness can be 0.125 in. The weld overlay 12 can be formed by depositing the weld overlay material in two passes using an automated (computer-controlled) weld overlay machine. Nonlimiting examples of automated weld overlay machines are available from Fronius USA LLC (Brighton, Mich.) and ARC Specialties, Inc. (Houston, Tex.). The weld overlay material deposited in the two passes can have substantially the same thickness as one another. For example, the thickness of each of the two passes can be 0.0625 in. In one embodiment, the surface of the weld 8 is prepared prior to the deposition of the weld overlay 12 by beveling, modifying or polishing the weld 8 to help ensure complete coverage of the weld 8 by the weld overlay 12. A nonlimiting example of an automated weld beveling machine is available from PROTEM USA LLC (Evergreen, Colo.). The weld overlay 12 can extend beyond the edges of the weld 8, e.g., 0.5 in in the axial direction of the VIT 10, to also cover the adjacent inner surfaces of the inner tube 2 and the outer tube 4.

The weld overlay 12 is made from a suitable weld overlay material for protecting the weld 8 under the conditions the VIT will experience in the field system. In one embodiment, the weld overlay material can be a nickel-based alloy used for welding electrodes and rods, e.g., according to specification AWS A-5.14/A-5.14 M (Jan. 1, 2018). In one embodiment, the weld overlay material is an ERNiCrMo-x alloy, such as, but not limited to, ERNiCrMo-3, ERNiCrMo-4, ERNiCrMo-10, ERNiCrMo-13 and ERNiCrMo-14. In one embodiment, the weld overlay material is ERNiCrMo-3. The weld overlay 12 protects the weld 8 from service conditions with hydrogen sulfide ($H_2S$) content exceeding the minimum specified by NACE International (Houston, Tex.) MR0175/ISO 15156 at the design pressure. The weld overlay 12 protects the weld 8 from corrosion from produced fluids and from acid stimulation fluids containing HCl or HF.

Chemical analysis of the weld overlay to determine percentage iron dilution can be performed using optical emission spectroscopy (OES) according to ASME BPVC Section IX, Figure QW-462.5(a) (2017). When percentage iron dilution is tested at 0.125 in from the fusion face. The dilution iron can be no more than 10% for corrosion resistance of the overlay. This is achieved by depositing the weld overlay material in two passes.

The outer tube 4 can have an external threaded profile 14 along a portion of length proximate the end of the outer tube 4 for attaching a coupling 16 having an internal threaded profile 18 for connecting two outer tubes 4 thereby connecting two segments of the VIT 10. Multiple segments of the VIT 10 can thus be connected by the threaded couplings 16 to form an elongated device for mitigating annular pressure buildup in a wellbore casing annulus of an oil or gas well. An external insulator 20 can be placed around the coupling 16.

The weld overlay 12 provides the VIT 10 with weld integrity which prevents corrosion or cracking of the weld 8, including $H_2S$ cracking, thus protecting against loss of vacuum in the vacuum gap 6. If the vacuum is lost, the VIT 10 can no longer mitigate APB as intended and the well could be lost.

The VIT 10 is able to withstand higher pressures than known VITs are capable of withstanding without collapsing and without losing vacuum. The API TR 5C3 calculations were used to determine the tubular performance rating.

Figure 3:
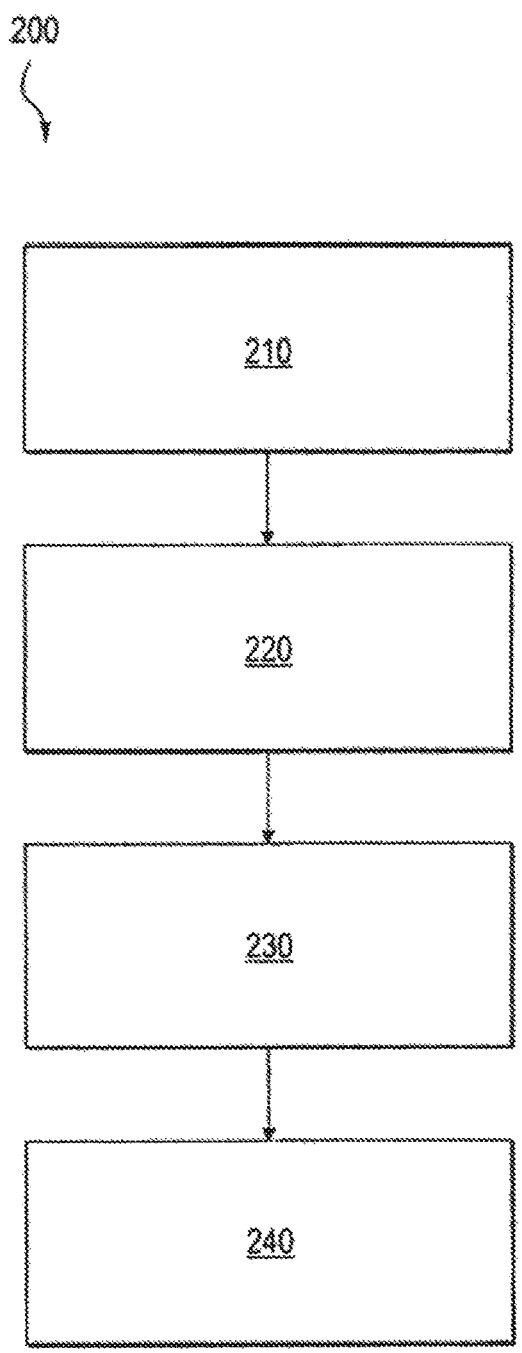
FIG. 3 is a flowchart of an example method for making an example apparatus.

Referring to FIG. 3, shown is a process 200 for process for forming the VIT 10. In step 210, an inner tube 2 and an outer tube 4 are provided. In step 220, the outer tube 4 is positioned around the inner tube 2 in such a way that an inner cylindrical corner is formed at an intersection between the inner tube 2 and an outer tube 4 as shown in FIG. 2 and described above. In step 230, a weld 8 is formed at the inner cylindrical corner having a weld surface. In step 240, the weld surface is modified to facilitate application of the weld overlay 12 onto the weld surface. In step 240, the weld overlay 12 is formed over the weld surface. The weld 8 and the weld overlay 12 do not extend into the inner bore. The weld 8 and the weld overlay 12 can be simultaneously heat treated (tempered) at a temperature greater than 800° F. In one embodiment, the post weld heat treatment (PWHT) for the weld 8 with the weld overlay 12 is conducted for 10 minutes at 1094° F. (+/−25° F.) using an induction heating system and multiple thermocouples.

It should be noted that only the components relevant to the disclosure are shown in the figures, and that other components normally part of a deepwater wellbore or vacuum insulated tubing may not be shown for simplicity.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

What is claimed is:

1. An apparatus for mitigating annular pressure buildup in a wellbore casing annulus of an oil or gas well, comprising:

a. an inner tubular member having a maximum outer diameter, an outer profile, an upset end, and a substantially constant inner diameter defining an inner bore;
   b. an outer tubular member having an outer profile, an inner profile, an inner diameter and an end, wherein the outer tubular member fits around the inner tubular member overlapping the end of the inner tubular member such that the end of the outer tubular member extends beyond the end of the inner tubular member and an inner cylindrical corner is formed at an intersection between the outer tubular member and the end of the inner tubular member, wherein the inner tubular member and the outer tubular member comprise a weldable martensitic stainless steel alloy having a yield strength ranging from 135 ksi to 150 ksi, and wherein the martensitic stainless steel alloy comprises 15Cr-6Ni-2Mo;
   c. an annular space between the inner tubular member and the outer tubular member formed by the outer profile of the inner tubular member and the inner profile of the outer tubular member, the annular space having a vacuum there within;
   d. a weld comprising a weld material at the inner cylindrical corner for joining the inner and outer tubular members and sealing the vacuum; and
   e. a weld overlay comprising a weld overlay material over the weld for protecting the weld formed using a mechanized gas tungsten arc process, wherein the weld and the weld overlay do not extend into the inner bore and wherein the weld material and the weld overlay material are different.

2. The apparatus of claim 1 wherein the weld material comprises ER410NiMo.

3. The apparatus of claim 1 wherein the weld overlay material comprises a nickel-based alloy.

4. The apparatus of claim 3 wherein the nickel-based alloy is an ERNiCrMo-x alloy.

5. The apparatus of claim 4 wherein the nickel-based alloy is selected from the group consisting of ERNiCrMo-3, ERNiCrMo-4, ERNiCrMo-10, ERNiCrMo-13 and ERNiCrMo-14.

6. The apparatus of claim 1 wherein the weld overlay has a thickness from about 0.12 in to about 0.13 in.

7. The apparatus of claim 1 wherein the weld overlay is formed by depositing the weld overlay material in two passes wherein the weld overlay material deposited in the two passes have substantially the same thickness as one another and wherein a percentage iron dilution in the weld overlay is less than 10% when tested at 0.125 in from a fusion face.

8. The apparatus of claim 1 wherein the outer tubular member further comprises an external threaded profile along a portion of length proximate the end of the outer tubular member for attaching a coupling having an internal threaded profile for connecting two outer tubular members thereby connecting two segments of the apparatus.

9. A system for producing oil and gas from a deepwater well, comprising:

a. a wellbore extending into a deepwater subterranean reservoir;
   b. a casing within the wellbore; and
   c. the device of claim 8 within the casing for carrying fluids from the deepwater subterranean reservoir to a surface location while mitigating annular pressure buildup in an annulus in the casing; wherein when exposed to high pressure, high temperature (HPHT) well conditions, the vacuum is not lost.

10. A method for producing oil and gas from a deepwater well, comprising:
   a. placing the device of claim 8 within a casing within a wellbore extending into a deepwater subterranean reservoir; and
   b. carrying fluids from the deepwater subterranean reservoir to a surface location through the device of claim 8, wherein, when exposed to high pressure, high temperature (HPHT) well conditions, the vacuum is not lost.

11. A device for mitigating annular pressure buildup in a wellbore casing annulus of an oil or gas well, comprising multiple apparatus of claim 1 connected by threaded couplings.

12. A process for forming an apparatus for mitigating annular pressure buildup in a wellbore casing annulus of an oil or gas well, comprising:
   a. providing an inner tubular member having a maximum outer diameter, an outer profile, an end, and a substantially constant inner diameter defining an inner bore;
   b. providing an outer tubular member having an inner profile and an inner diameter, wherein the outer tubular member has sufficient inner diameter to fit around the inner tubular member;
   c. positioning the outer tubular member around the inner tubular member and overlapping the end of the inner tubular member such that an inner cylindrical corner is formed at an intersection between the outer tubular member and the end of the inner tubular member, wherein the inner tubular member and the outer tubular member comprise a weldable martensitic stainless steel alloy having a yield strength ranging from 135 ksi to 150 ksi, and wherein the martensitic stainless steel alloy comprises 15Cr-6Ni-2Mo;
   d. forming a weld at the inner cylindrical corner having a weld surface using a weld material;
   e. modifying the weld surface to facilitate application of a weld overlay onto the weld surface; and
   f. forming the weld overlay over the weld surface using a weld overlay material such that the weld and the weld overlay do not extend into the inner bore, wherein the weld material and the weld overlay material are different.

13. An apparatus for mitigating annular pressure buildup in a wellbore casing annulus of an oil or gas well, comprising:
   a. an inner tubular member having a maximum outer diameter, an outer profile, an upset end, and a substantially constant inner diameter defining an inner bore;
   b. an outer tubular member having an outer profile, an inner profile, an inner diameter and an end, wherein the outer tubular member fits around the inner tubular member overlapping the end of the inner tubular member such that the end of the outer tubular member extends beyond the end of the inner tubular member and an inner cylindrical corner is formed at an intersection between the outer tubular member and the end of the inner tubular member, wherein the inner tubular member and the outer tubular member comprise a weldable martensitic stainless steel alloy;
   c. an annular space between the inner tubular member and the outer tubular member formed by the outer profile of the inner tubular member and the inner profile of the outer tubular member, the annular space having a vacuum there within;
   d. a weld comprising a weld material at the inner cylindrical corner for joining the inner and outer tubular members and sealing the vacuum, wherein the weld material comprises a ER410NiMo alloy; and
   e. a weld overlay comprising a weld overlay material over the weld for protecting the weld formed using a mechanized gas tungsten arc process, wherein the weld and the weld overlay do not extend into the inner bore, and wherein the weld overlay material comprises a nickel-based alloy selected from the group consisting of ERNiCrMo-3, ERNiCrMo-4, ERNiCrMo-10, ERNiCrMo-13 and ERNiCrMo-14.

\* \* \* \* \*